(12) United States Patent
Verma et al.

(10) Patent No.: US 10,740,639 B2
(45) Date of Patent: Aug. 11, 2020

(54) CAPTURING HANDWRITING BY A CARTRIDGE COUPLED TO A WRITING IMPLEMENT

(71) Applicant: Microsoft Technology Licensing, LLC, Redmond, WA (US)

(72) Inventors: Arunabh P. Verma, Seattle, WA (US); Sophie A. Beland, Seattle, WA (US); Oluwadara Oke, Seattle, WA (US); William M. Geraci, II, Sammamish, WA (US); Kevin J. Jeyakumar, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 15/415,861

(22) Filed: Jan. 25, 2017

(65) Prior Publication Data
US 2018/0211126 A1 Jul. 26, 2018

(51) Int. Cl.
| | | |
|---|---|---|
| *G06K 9/22* | (2006.01) | |
| *G06F 3/0354* | (2013.01) | |
| *G06K 9/00* | (2006.01) | |
| *G06F 3/0488* | (2013.01) | |
| *G06F 21/32* | (2013.01) | |
| *G06F 3/01* | (2006.01) | |
| *G06F 3/038* | (2013.01) | |

(52) U.S. Cl.
CPC ............ *G06K 9/222* (2013.01); *G06F 3/016* (2013.01); *G06F 3/017* (2013.01); *G06F 3/0383* (2013.01); *G06F 3/03545* (2013.01); *G06F 3/03546* (2013.01); *G06F 3/04883* (2013.01); *G06F 21/32* (2013.01); *G06K 9/00154* (2013.01); *G06K 9/00355* (2013.01)

(58) Field of Classification Search
CPC .................................................... G06K 9/222
See application file for complete search history.

(56) References Cited

U.S. PATENT DOCUMENTS

| | | | |
|---|---|---|---|
| 7,096,432 B2 | 8/2006 | Huapaya et al. | |
| 2004/0140964 A1* | 7/2004 | Wang .................. | G06F 3/03545 345/179 |

(Continued)

OTHER PUBLICATIONS

"A Revolutionary Pen That Draws in Any Color", https://web.archive.org/web/20140829222301/http:/getscribblepen.tilt.com/a-revolutionary-pen-that-draws-in-any-color, Published on: Aug. 29, 2014, 11 pages.
Mathews, Lee, "Phree is a write-anywhere smartpen that also takes phone calls", http://www.geek.com/gadgets/phree-is-a-write-anywhere-smartpen-that-also-takes-phone-calls-1623236/, Published on: May 20, 2015, 2 pages.

(Continued)

*Primary Examiner* — Gustavo Polo

(57) ABSTRACT

The electronic devices described herein are configured to enhance user experience associated with using a pen or other writing implement and capturing the content written or drawn. A cartridge device is coupled to or included in the pen or writing implement. The cartridge device is configured to collect pen input based on the pen being used by a user to write or draw. Collected pen input is saved on the cartridge device and, when a connection to a network storage device or cloud server is detected, the collected pen input is uploaded. The cartridge device may be associated with a user account based on user credentials, such that pen input stored and/or uploaded is associated with the user account on the cartridge device and don the network storage device or cloud server.

20 Claims, 6 Drawing Sheets

(56) References Cited

U.S. PATENT DOCUMENTS

| | | | |
|---|---|---|---|
| 2005/0261972 A1* | 11/2005 | Black | G06F 3/03545 705/21 |
| 2007/0126716 A1 | 6/2007 | Haverly | |
| 2009/0037224 A1* | 2/2009 | Raduchel | G06Q 50/24 705/3 |
| 2010/0289776 A1* | 11/2010 | Bryborn Krus | G06F 3/03545 345/179 |
| 2011/0025633 A1 | 2/2011 | Janik | |
| 2013/0106766 A1 | 5/2013 | Yilmaz et al. | |
| 2014/0176495 A1 | 6/2014 | Vlasov | |
| 2014/0237342 A1* | 8/2014 | King | G06F 16/955 715/224 |
| 2014/0253466 A1 | 9/2014 | Brewer | |
| 2014/0362022 A1 | 12/2014 | Latella et al. | |
| 2016/0162137 A1 | 6/2016 | Black et al. | |

OTHER PUBLICATIONS

Nguyen, Chuong, "Universal stylus to bring easy digital inking to tablets", http://www.in.techradar.com/news/computing/Universal-stylus-to-bring-easy-digital-inking-to-tablets/articleshow/48600440.cms, Published on: Aug. 22, 2015, 5 pages.

"Universal Stylus Pens for All Touch Screen Devices", http://www.easy.lk/info.php?id=411, Retrieved on: Nov. 8, 2016, 2 pages.

Kruk, Oleg, "A Digital Pen in the IoT System with the DeviceHive Platform", http://orange.dataart.com/digital-pen-iot-system-devicehive-platform/, Published on: Aug. 31, 2014, 3 pages.

Adam, "The 10 Best Smart Pens—Immediate Analogue to Digital", http://www.appcessories.co.uk/best-smart-pens-immediate-analogue-to-digital/, Published on: May 15, 2016, 20 pages.

* cited by examiner

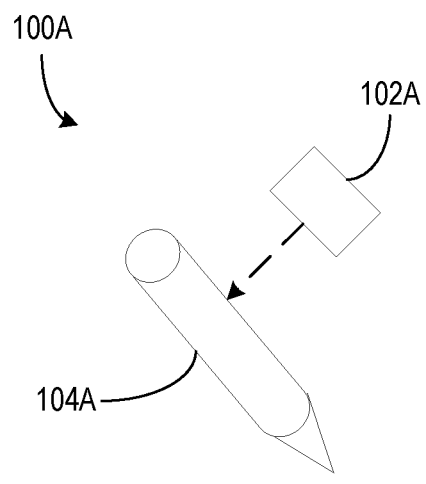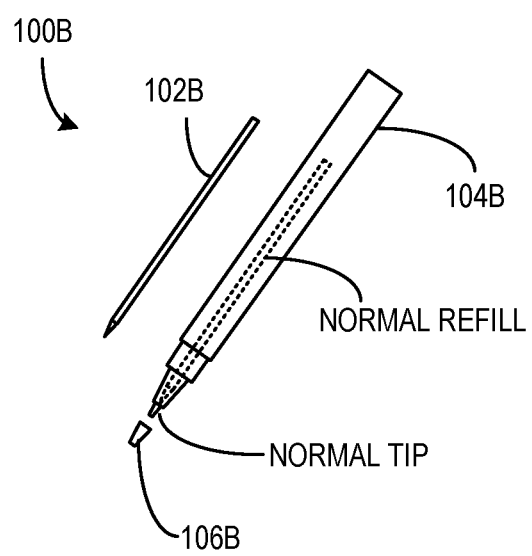
FIG. 1A
FIG. 1B

CAPTURING HANDWRITING BY A CARTRIDGE COUPLED TO A WRITING IMPLEMENT

BACKGROUND

Electronic devices, such as personal computers, laptops, mobile phones, and the like are increasingly equipped with touch screens or similar interfaces that enable a user to provide input by writing or drawing with a stylus, pen, or other pen-like device. For instance, tablet computers, which include touch screens as the primary user interface, have become popular alternatives to conventional laptops with keyboards, mice, etc. The ability to draw or write by hand on the touch screen offers substantial flexibility regarding possible inputs. However, the capture of writing input may be largely limited to writing on the touch screens and similar interfaces of electronic devices. In many instances, important information is written on other surfaces, such as paper or whiteboards, with conventional writing implements, limiting the ability to capture the information digitally.

Use of a conventional pen or other similar writing implement results in written information that is inconvenient to convert to a digital format, requiring transcribing or the like. The inconvenience of conversion renders the written information less secure and more difficult to share than information written using a touch screen device with a stylus.

Additionally, when using a stylus or the like with touch screen technology, a user may be limited to use of touch screen devices, and to switch devices, it may require an additional 'sign on', which makes use of the touch screen technology unintuitive and/or unpleasant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A device comprising a cartridge configured to couple to a writing implement, the cartridge capturing content generated by a user with the writing implement; and a memory storing the content generated by the user with the cartridge.

A computerized method comprises collecting, by a cartridge device, pen input associated with use of the cartridge device; storing the collected pen input on the cartridge device; and upon detecting, by the cartridge device, an accessible network storage device over a network connection, uploading, by the cartridge device, the stored pen input to the accessible network storage device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIGS. 1A-1B illustrate systems including an electronic cartridge device and an associated pen according to an embodiment;

In FIGS. 1 to 6, the systems are illustrated as schematic drawings. The drawings may not be to scale.

DETAILED DESCRIPTION

Figure 2:
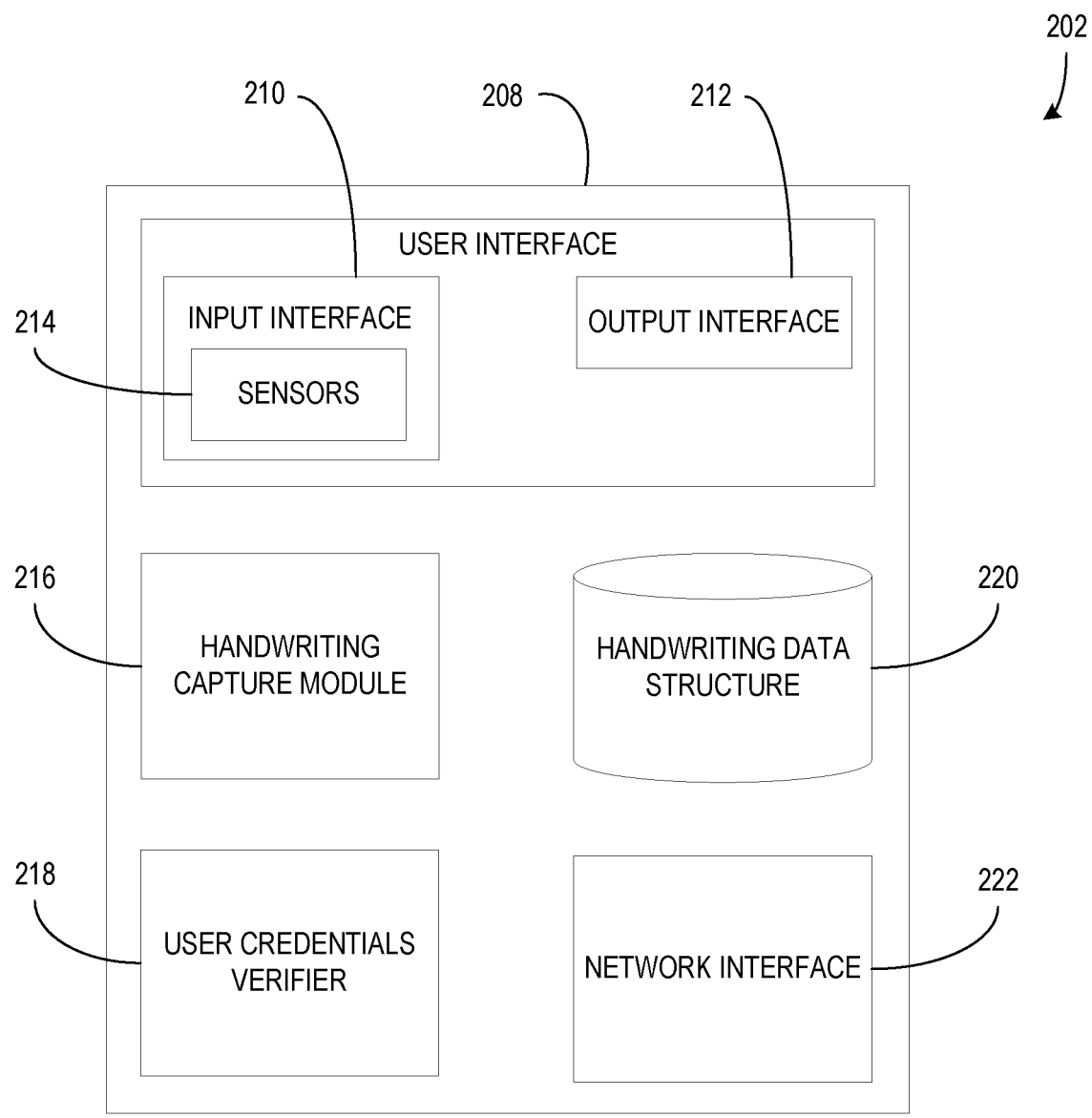
FIG. 2 illustrates a block diagram of an electronic cartridge device including sensors and a handwriting capture module according to an embodiment.

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device' and the like are used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, media players, games consoles, personal digital assistants, and many other devices.

The electronic devices described below are configured to enhance user experience associated with using a pen or other writing implement and capturing the content written or drawn. A cartridge device is coupled to or included in the pen or writing implement. The cartridge device is configured to collect pen input based on the pen being used by a user to write or draw. Collected pen input is saved on the cartridge device and, when a connection to a network storage device or cloud server is detected, the collected pen input is uploaded. The cartridge device may be associated with a user account based on user credentials, such that pen input stored and/or uploaded is associated with the user account on the cartridge device and don the network storage device or cloud server.

FIGS. 1A-1B illustrate systems 100A and 100B including electronic cartridge devices 102A and 102B and associated pens 104A and 104B according to an embodiment.

In system 100A, the cartridge device 102A is coupled to the pen (e.g., a conventional pen, stylus, or other writing implement, etc.) 104A as illustrated by the dotted line. The pen 104A may be a conventional ink pen or the like, and the cartridge device 102A may couple to the pen 104A in such a way that the pen 104A may still be used to write and/or draw. For instance, the cartridge 102A may be coupled to a shaft, or middle portion, of the pen 104A, near or on the tip of the pen 104A, and/or near or on the end opposite the tip of the pen 104A. The cartridge 102A may be coupled to the pen 104A by clipping, latching, adhering or otherwise sticking, strapping, sliding onto, wrapping around the pen 104A like a sleeve, etc. In an example, the coupling of the cartridge device 102A to the pen 104A is temporary, such that the cartridge 102A may later be uncoupled from the pen 104A and then coupled to another pen.

In system 100B, the cartridge device 102B, which is a "smart refill" device, may be placed within the pen 104B as illustrated by the dotted line representation of a refill-shaped object within the pen 104B. The cartridge device 102B may be shaped to fit within the pen 104B in the same or similar manner as a conventional refill object associated with the pen 104B. The cartridge device 102B may include some or all of the electronic and/or computer components as described herein in order to enable the cartridge device 102B to collect pen input associated with a user writing with the pen 104B, as described herein. In addition to the cartridge device 102B, the system 100B may include an associated "smart tip" 106B, which may be linked to the cartridge device 102B and may contribute to the collection of pen input, the storage of pen input, and/or the uploading of pen input as described herein. For instance, the smart tip 106B may include one or more sensors for detecting writing done using the pen 104B. Further, the smart tip 106B may include a communication component enabling the smart tip 106B to share collected sensor data with the cartridge device 102B. In an example, the communication component may enable wireless communications, wired communication, or the like between the smart tip 106B and the cartridge 102B.

In an example, a cartridge device (e.g., cartridge device 102A, 102B, etc.) may be joined, installed, or otherwise coupled permanently to a pen (e.g., pen 104A, 104B, etc.) such that the pen and cartridge device behave as a single pen device.

A cartridge (e.g., cartridge 102A, 102B, etc.) comprises electronic components that enable the cartridge to interact with a pen, a user of the pen, other electronic devices, etc. For instance, the cartridge may include a wireless communication interface that enables the cartridge to communicate wirelessly (via Wi-Fi, cellular, BLUETOOTH brand short-range wireless communication protocol, other radio frequency communications, etc.) with the other electronic devices. Further, the cartridge may include buttons, switches, and/or other input interfaces which a user may use to interact with the cartridge and/or electronic components of the cartridge. Additionally, or alternatively, the cartridge may include pressure sensors, motion sensors, accelerometers, gyroscopic sensors, or the like that enable the detection of motion, direction, angle, gestures, etc. of the cartridge and/or a pen to which the cartridge is coupled.

FIG. 2 illustrates a block diagram of an electronic cartridge device 202 including sensors 214 and a handwriting capture module 216 according to an embodiment. The cartridge device 202 comprises a user interface 208, which includes input interface 210 and output interface 212, the input interface including sensors 214, a handwriting capture module 216, a user credentials verifier 218, a handwriting data structure 220, and a network interface 222.

In an example, the user interface 208 includes a touch screen. The input interface 210 includes a layer or portion of the touch screen that detects the location of contact, depression, or the like on the touch screen. Contact on the touch screen, whether by a user's finger, pen, stylus, or the like, is detected by the input interface 210 and interpreted as input to the user interface 208. The output interface 212 includes a layer or portion of the touch screen that displays, renders, or otherwise outputs information to a user of the cartridge device 202. The output interface 212 may display colors, shapes, letters, or the like to communicate output information to a user of the electronic device. Further, the output interface 212 may include lights or the like for providing information, such as a status of the cartridge device 202, to a user.

Alternatively, or additionally, the input interface 212 may receive input from a pen (e.g., pen 104A, 104B, etc.) coupled or otherwise attached to the cartridge device 202 as described above with respect to FIG. 1. Sensors 214 of the cartridge device 202 may collect input from the pen in the form of readings and/or data based on use of the pen (e.g., motion, angle, acceleration, etc. of the pen when a user writes with the pen, etc.).

The input interface 210 may include other interfaces, such as switches, buttons, microphones, etc. These components of the input interface 210 further enable a user to input information into the cartridge device 202. For instance, the input interface 210 may include a capture button that, when pressed, indicates that the cartridge should begin collecting/capturing pen input/content generated by a user with the pen/writing implement.

In an example, the output interface 212 may further include speakers, vibration components, etc. These components of the output interface 212 further enable the electronic device 202 to communicate output information to a user. For instance, a vibration component of the output interface 212 may vibrate to provide a notification to the user of the electronic device 202.

The sensors 214 may collect various types of data as pen input based on the use of the cartridge device 202 and/or attached pen to write and/or draw. The sensors 214 may include one or more of a motion sensor, an accelerometer, a gyroscope sensor, a pressure sensor (e.g., detecting grip pressure when user writes, etc.), a capacitive sensor, or a friction-based sensor, etc. For instance, the sensors 214 may include one or more accelerometers that gather acceleration data based on the motion of the cartridge device 202 and attached pen and the gathered acceleration data may be used to determine speed, changes in direction, etc. of the cartridge device 202 because of a user writing and/or drawing with the pen. Alternatively, or additionally, the sensors 214 may include one or more friction-based sensors (e.g., a trackball sensor, etc.) that, when dragged over a paper, whiteboard, or other surface, gather data regarding direction of the tip of the pen as a user writes and/or draws. In an example, a friction-based sensor is built into a smart tip (e.g., smart tip 106B, etc.) and communicates gathered data to the associated cartridge device 202.

The handwriting capture module 216 is a software component of the cartridge device 202 that interacts with the sensors 214 to capture and/or collect handwriting input/content from a user of the cartridge device 202 and attached pen. The handwriting capture module 216 receives the data collected by the sensors 214 and may perform analysis, transformation, and/or other processing on the data in order to capture the pen input and store it in the handwriting data structure 220. In an example, the sensors 214 collect data based on the motion of the cartridge device 202 whether or not the attached pen is being used to write and/or draw. Motion data may be collected when a user is walking with the cartridge device 202, picking up and/or moving the cartridge device 202, accidentally dropping the cartridge device 202, etc. The handwriting capture module 216 may detect patterns in the pen input sensor data such that pen input based on writing and/or drawing with the pen and attached cartridge device 202 is identified in contrast to other pen input that is not based on writing and/or drawing. The identified pen input based on writing and/or drawing may be stored in the handwriting data structure, while the remaining pen input data may be deleted and/or otherwise removed.

In an alternative example, the handwriting capture module 216 receives pen input data from the sensors 214 and writes all of the pen input data to the handwriting data structure 220. In this case, any analysis or processing of the pen input data to recognize and/or make use of the pen input data as handwriting may be done by a separate device and/or process after the handwriting data structure 220 is uploaded.

The user credentials verifier 218 is a software component of the cartridge device 202 that verifies a user's credentials to associate the use of the cartridge device 202 with the user's account. The user credentials verifier 218 may receive a user's credentials from the input interface 210 and/or the network interface 222. For instance, the input interface 210 may include a biometric reader, such that a user may scan a fingerprint in order to provide credentials. The fingerprint scan data is provided to the user credentials verifier 218, which compares the provided fingerprint scan data with a user's fingerprint data, which may be stored on the cartridge device 202 and/or accessed from a network location via the network interface 222. When the user's credentials are verified, the user credentials verifier 218 causes the cartridge device 202 to be linked to an account associated with the verified user, such that handwriting data collected by the cartridge device 202 is uploaded to a network storage data structure, or cloud data structure, associated with the linked account.

In an example, the user credentials verifier 218 receives user credentials over the network interface 222. For instance, the cartridge device 202 may be paired or otherwise linked to another electronic device. A user of the electronic device may be prompted for and provide a username and password as credentials for verification by the cartridge device 202. The provided credentials may be sent to the cartridge device 202 and the user credentials verifier 218 for verification.

In an alternative or additional example, the user credentials verifier 218 receives user credentials from the sensors 214 and/or handwriting capture module 216. For instance, the user credentials verifier 218 may store, or access via the network interface 222, one or more handwriting patterns associated with a user's account, such as a handwritten signature pattern or the like. In order to provide user credentials, a user may use the pen to which the cartridge device 202 is coupled to write a handwritten signature, and if the collected data from writing the handwritten signature matches the handwritten signature pattern, the user may be verified and the cartridge device 202 may be linked to the user's account.

Further, the cartridge device 202 may include a keypad or the like as part of the input interface 210, and the user credentials verifier 218 may receive credentials from the input interface 210 in the form of a password or personal identification number (PIN), etc.

The handwriting data structure 220 stores pen input data collected by the sensors 214 and the handwriting capture module 216 as described above. The pen input data may be stored as it is collected from the sensors 214, or it may be analyzed, transformed, or otherwise processed in order to render it compatible for use by other software and/or electronic devices, compress it, encrypt it, remove extraneous data points, etc. While the handwriting data structure 220 is illustrated as being within the cartridge device 202 in FIG. 2, in some examples, some or all of the handwriting data structure 220 may be located elsewhere, such as in a network storage device, or cloud storage device, etc.

The network interface 222 provides an interface by which the cartridge device 202 may communicate with other electronic devices, computing devices, access points, or the like. The network interface 222 may provide access to one or more channels of network communication, including wired network connections, wireless network connections (e.g., Wi-Fi network connections, short-range radio network connections, cellular network interfaces, etc.), etc. In some examples, components described as being part of the cartridge device 202 may instead be located outside of the cartridge device 202 and accessed by the electronic device via the network interface 222.

Figure 3:
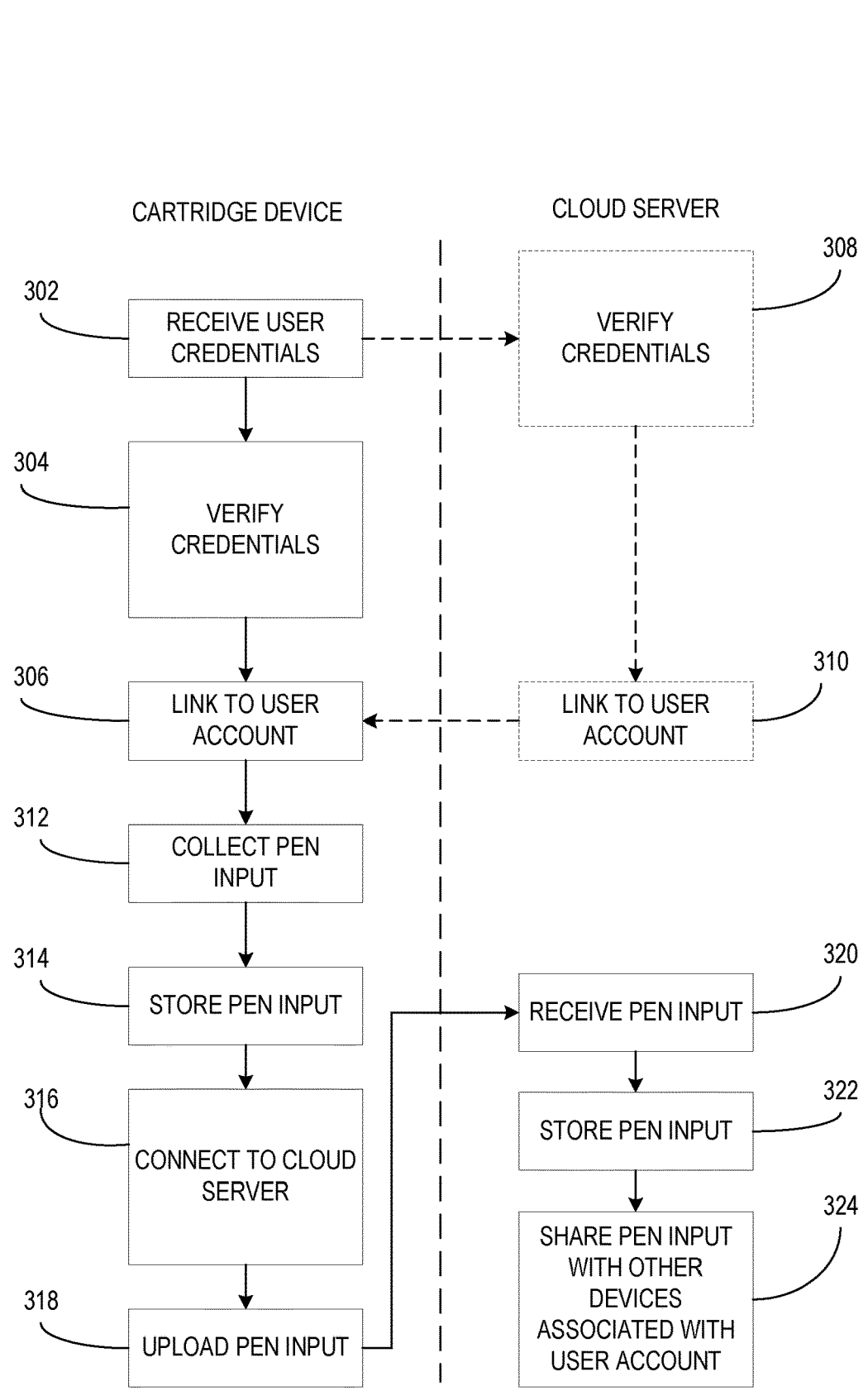
FIG. 3 illustrates a diagram of interactions between a cartridge device and a cloud server according to an embodiment.

FIG. 3 illustrates a diagram 300 of interactions between a cartridge device (e.g., cartridge device 202, etc.) and a cloud server according to an embodiment. It should be understood that the diagram 300 assumes the presence of a network connection between the cartridge device and the cloud server. The cartridge device receives credentials at 302 and, when the credentials are verified at 304, the cartridge device is linked to a user account associated with the received credentials at 306.

Alternatively, or additionally, the received credentials may be provided to the cloud server, as illustrated by the dotted line arrow, and, when the cloud server verifies the user credentials at 308, the cloud server may link the cartridge device to the user account associated with the user credentials at 310. Notification of the link between the cartridge device and the user account may then be sent by the cloud server to the cartridge device.

At 312, the cartridge device collects pen input and, at 314, the cartridge device stores the collected pen input. At 316, the cartridge device checks to confirm that a connection to the cloud server is present. When the connection is confirmed, the cartridge device uploads the collected pen input to the cloud server.

At 318, the cloud server receives the pen input and, at 320, the cloud server stores the received pen input. Further, at 322, the cloud server shares the pen input with other devices associated with the user account.

In some examples, the cloud server includes one or more electronic devices and/or computing devices to which the cartridge device may connect via a network connection, either directly or indirectly. The cloud server stores, processes, and/or transfers pen input, handwriting data structures, user credentials, or the like, as described herein. When the cartridge device uploads and/or syncs pen input and/or handwriting data structures with the cloud server, the uploaded pen input and/or handwriting data structures are accessible via the user account associated with the user credentials on other electronic devices and/or computing devices. For instance, handwriting data structures uploaded from the cartridge device to the cloud server may later be accessed on a user's personal computer, laptop, or mobile device.

Receiving and verifying credentials may be performed as described above with respect to the user credentials verifier 218 of FIG. 2. User credentials may include username, password, PIN, biometric data, handwritten signature, etc. Verifying the credentials may be performed by comparing received credentials to stored credential data. The verification may be performed by the cartridge device and/or the cloud server.

Linking the cartridge device to the user account may include providing the cartridge device with a token and/or other session identifier enabling the cartridge device to store and upload pen input and/or handwriting data structures as being associated with the user account. The token may be temporary such that the link between the cartridge device and the user account lasts a limited amount of time. Alternatively, or additionally, the token may be revoked or rejected based on a lack of activity associated with the link between the cartridge device and the user account. In an alternative example, the link may remain active until the user of the user account chooses to break or remove the link.

Further, in some examples, the cartridge device has a cartridge identifier (ID), which may be shared with the cloud server when a link to the user account is formed. The cloud server may record the link between the user account and the cartridge ID, such that the relationship may be accessible to other electronic devices or the like.

Verifying that the cartridge device is connected to the cloud server may include verifying that the cartridge device is connected to a trusted, or authenticated, device (e.g., a network storage device, etc.) and/or network connection. A user account may include trusted devices and/or network connections that are the only devices and/or network connections that a cartridge device linked to the user account may use to upload pen input and/or handwriting data structures. Trusted entities (e.g., devices, network connections, etc.) may be defined by the user of the user account prior to use. Additionally, or alternatively, an entity may be granted a trusted status based on the user account using the entity in the past to upload pen input and/or handwriting data structures.

The cloud server shares uploaded pen input and/or handwriting data structures with other devices associated with the user account at 322. In an example, the cloud server stores pen input such that, when a device associated with the user account connects to the cloud server, the cloud server provides the stored pen input to the device. The device may then access the pen input. For instance, a user may take notes in a meeting using the cartridge device. The cartridge device may upload the pen data associated with the notes to a cloud server. Later, the user may open a note-taking application on a laptop that is associated with the same user account and the cloud server may provide the uploaded notes pen data to the laptop for display and use in the note-taking application.

Figure 4:
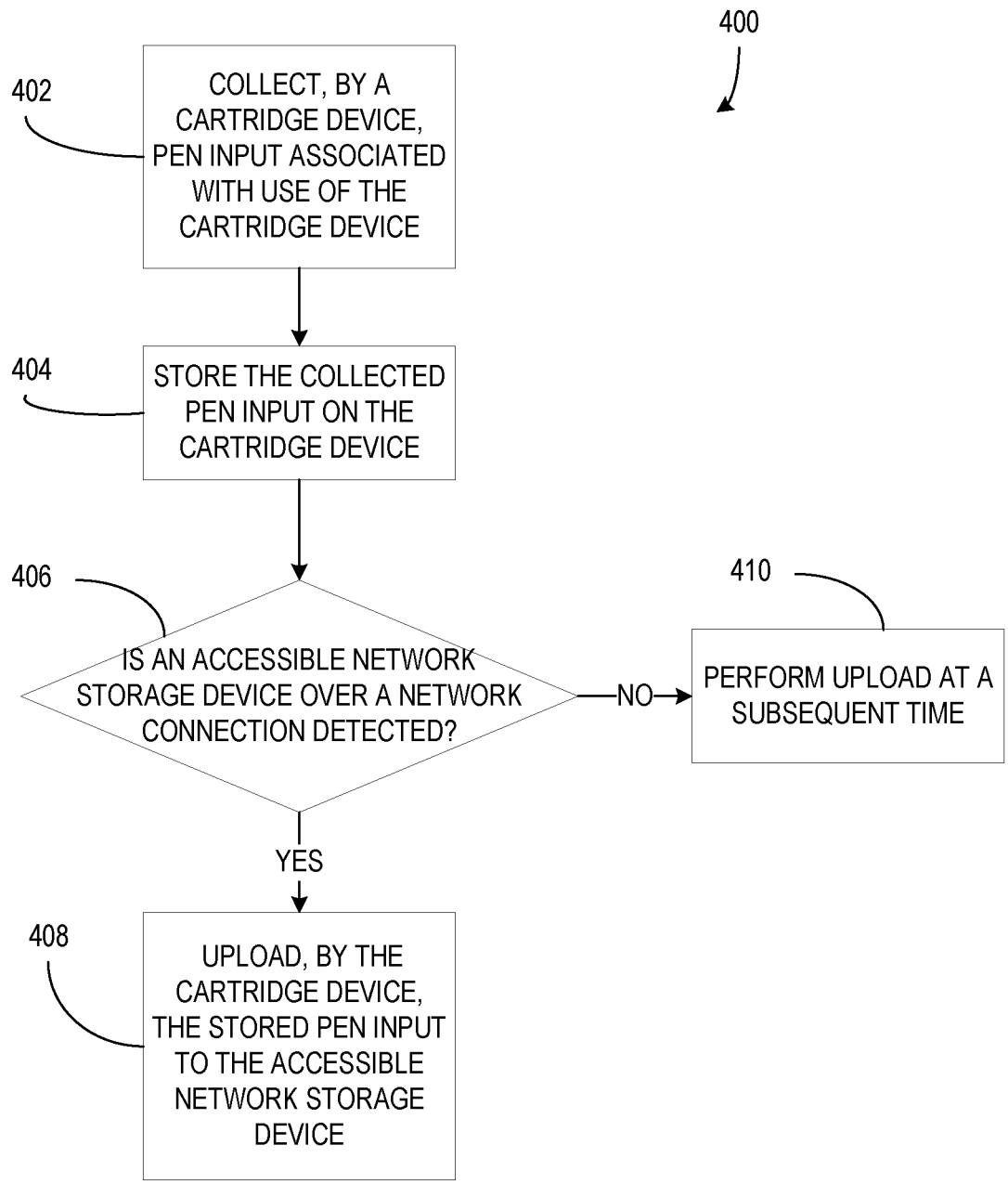
FIG. 4 illustrates a flow chart of a method of collecting pen input, storing the pen input, and uploading the pen input according to an embodiment.

FIG. 4 illustrates a flow chart of a method 400 of collecting pen input, storing the pen input, and uploading the pen input according to an embodiment. The method 400 comprises, at 402, collecting, by a cartridge device, pen input associated with use of the cartridge device. The collected pen input may be associated with motion of the cartridge device, angle of the cartridge device, direction of the cartridge device, grip pressure of the cartridge device, contact with the cartridge device, etc.

At 404, the collected pen input is stored on the cartridge device. In an example, storing the pen input includes recognizing a portion of the pen input as handwriting, converting the recognized portion into a handwriting data structure, and storing the handwriting data structure on the cartridge device.

Upon detecting, by the cartridge device, an accessible network storage device over a network connection at 406, the stored pen input is uploaded to the accessible network storage device by the cartridge device at 408. The cartridge device may be associated with a user account and the stored pen input may be uploaded to a data structure associated with the user account. If no network storage device is detected, then the upload is performed later at 410 when the network connection and network storage device becomes available.

Figure 5:
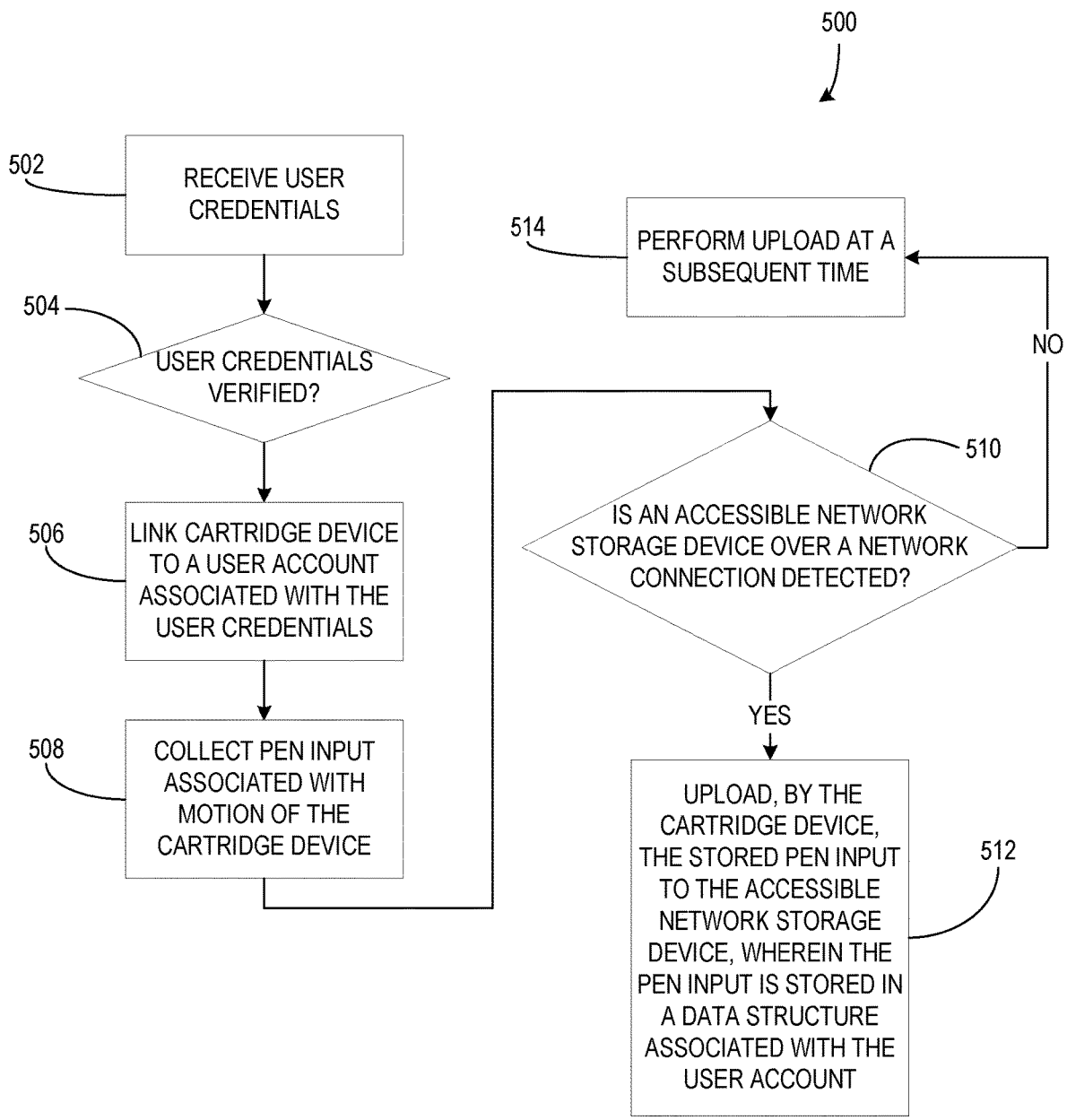
FIG. 5 illustrates a flow chart of a method of verifying received user credentials, collecting pen input, and uploading the pen input according to an embodiment.

FIG. 5 illustrates a flow chart of a method 500 of verifying received user credentials, collecting pen input, and uploading the pen input according to an embodiment. The method 500 comprises receiving, at 502, user credentials. For instance, the user credentials may include biometric data, handwritten signature input from the cartridge device, username and password, a PIN, or the like. The user credentials may be received by input to a cartridge or via a network connection with an electronic device.

Upon verifying the user credentials at 504, the cartridge device is linked to a user account associated with the user credentials at 506. At 508, pen input associated with motion of the cartridge device is collected.

Upon detecting, at 510, an accessible network storage device over a network connection, the cartridge device uploads the stored pen input to the accessible network storage device at 512. The pen input is stored in a data structure associated with the user account. In an example, uploading the collected pen input to the accessible network storage device includes the cartridge device sharing the user credentials with the accessible network storage device and receiving verification of the user credentials from the accessible network storage device prior to uploading the collected pen input. If no network storage device is detected, then the upload is performed later at 514 when the network connection and network storage device becomes available.

Further, detecting an accessible network storage device over a network connection may require the network connection to have a trusted status. A trusted status may be based on at past use of the network connection or definition as a trusted network connection by a user associated with the user credentials.

In an example, the method 500 further comprises recognizing a portion of the collected pen input as handwriting and converting the recognized portion of the collected pen input into a handwriting data structure. The handwriting data structure is stored on the cartridge device and uploaded to the accessible network storage device.

In an additional example, the cartridge device may be coupled to a pen, stylus, or other writing implement and a user is using the writing implement with a touch screen-equipped electronic device. The cartridge device may be associated with a user account of the user, such that stored and uploaded pen input is associated with the user account. Further, the cartridge device may be in communication with the touch screen-equipped electronic device over a wireless network connection or the like. The cartridge device may provide the electronic device with user credentials and/or a token associated with the user account to demonstrate the link with the user account. As the pen to which the cartridge device is coupled is used to write on the touch screen of the electronic device, the electronic device may collect pen input from the touch screen. Because the cartridge device provided the user credentials and/or token, the electronic device may store the collected pen input as associated with the user account linked to the cartridge device. Further, the electronic device may send the collected pen input to the cartridge device for storage on the cartridge device and/or the electronic device may upload the collected pen input to a network storage device or cloud server, where the pen input may be stored in a data structure associated with the user account.

In a further example, the user of the cartridge device and coupled writing implement may begin to use the writing implement to write on a second touch screen-equipped electronic device. As the writing begins, the cartridge device may send user credentials and/or a token associated with the user account to the second electronic device based on a proximity to the second electronic device. The second electronic device may receive the credentials and/or token, verify that the cartridge device is linked to the user account, and collecting, sending, and/or uploading pen input from the writing implement as described above with the previous electronic device. In this way, the cartridge device and coupled writing implement may be used seamlessly with many different touch screen-equipped devices.

Figure 6:
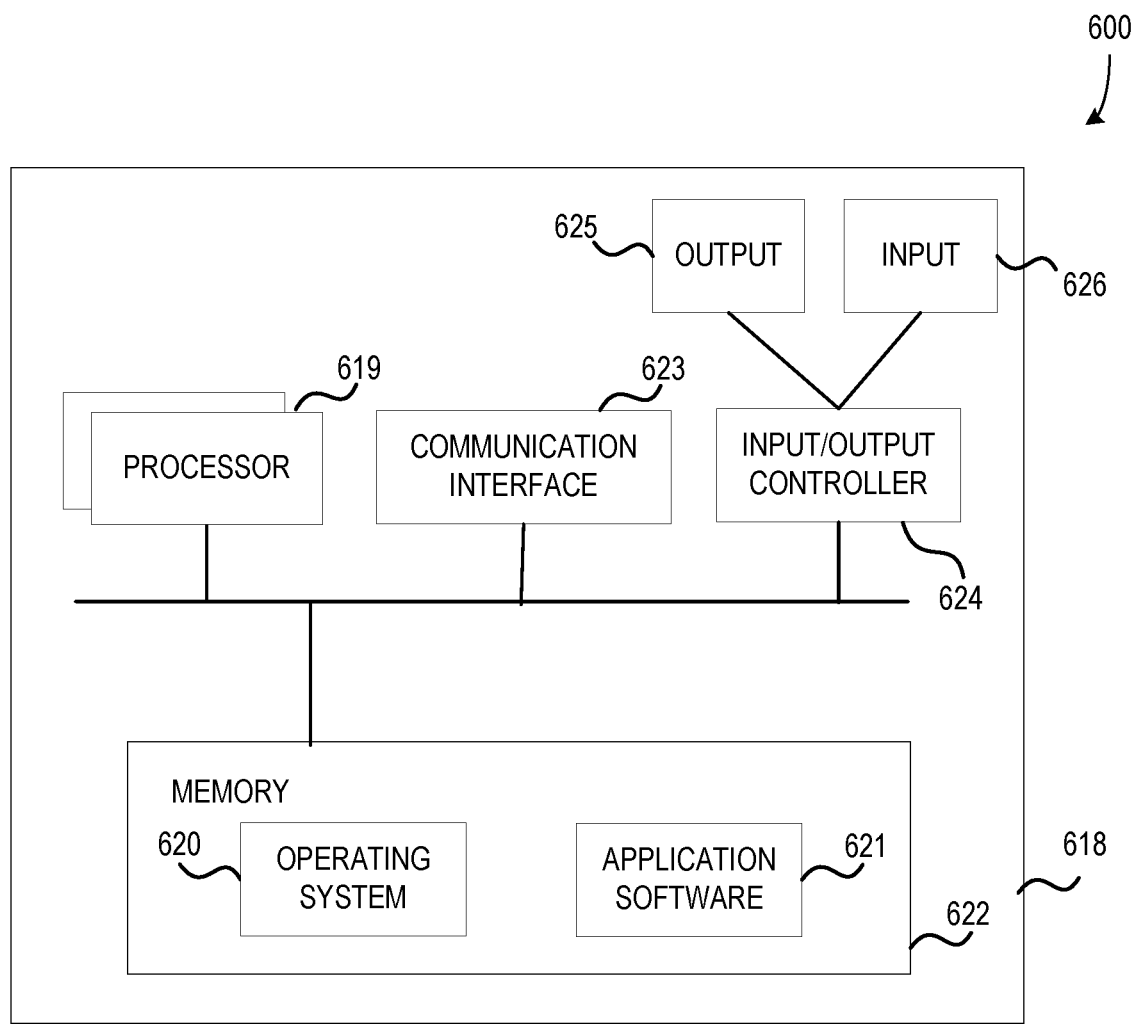
FIG. 6 illustrates a computing apparatus according to an embodiment as a functional block diagram.

FIG. 6 illustrates a computing apparatus 618 according to an embodiment as a functional block diagram. In an embodiment, components of a computing apparatus 618 may be implemented as a part of an electronic device and/or computing device according to one or more embodiments described in this specification. The computing apparatus 618 comprises one or more processors 619 which may be microprocessors, controllers or any other suitable type of processors for processing computer executable instructions to control the operation of the electronic device. Platform software comprising an operating system 620 or any other suitable platform software may be provided on the apparatus 618 to enable application software 621 to be executed on the device. According to an embodiment, receiving and verifying user credentials, collecting and storing pen input, and uploading pen input via a network connection may be accomplished by software. Furthermore, it may receive network communications from other computing devices via a network or other type of communication link pertaining to user credentials, linking to user accounts, received pen input, or the like.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, etc.

Alternatively, or in addition to the other examples described herein, examples include any combination of the following:

A device comprising:

a cartridge configured to couple to a writing implement, the cartridge capturing content generated by a user with the writing implement; and a memory storing the content generated by the user with the cartridge.

The device described above, wherein the cartridge includes at least one sensor, wherein capturing content generated by a user with the writing implement includes capturing data generated by the at least one sensor.

The device described above, wherein the at least one sensor includes at least one of a motion sensor, an accelerometer, a gyroscope sensor, or a friction-based sensor.

The device described above, further comprising a network interface transferring the content generated by the user with the cartridge over a network.

The device described above, wherein the network interface includes at least one of a wireless network interface or a wired network interface.

The device described above, wherein the network interface includes a wireless network interface configured for operation as at least one of a Wi-Fi network interface, a short-range radio network interface, or a cellular network interface.

The device described above, further comprising a biometric reader, the biometric reader capturing a fingerprint of a user, wherein the user's identity is verified based on the fingerprint.

The device described above, wherein the cartridge is configured to couple to a writing implement by at least one of coupling to a writing tip of the writing implement, coupling to a tip opposite the writing tip of the writing implement, sliding onto a middle portion of the writing implement, or clipping onto a portion of the writing implement.

The device described above, wherein the cartridge includes a capture button, wherein the cartridge begins capturing content generated by a user with the writing implement when the capture button is pressed.

A computerized method comprising:
collecting, by a cartridge device, pen input associated with use of the cartridge device;
storing the collected pen input on the cartridge device; and
upon detecting, by the cartridge device, an accessible network storage device over a network connection, uploading, by the cartridge device, the stored pen input to the accessible network storage device.

The method described above, wherein collecting pen input associated with use of the cartridge device includes collecting pen input associated with at least one of motion of the cartridge device, angle of the cartridge device, direction of the cartridge device, grip pressure on the cartridge device, or contact with the cartridge device.

The method described above, wherein storing the collected pen input on the cartridge device includes recognizing a portion of the collected pen input as handwriting;
converting the recognized portion of the collected pen input into a handwriting data structure; and
storing the handwriting data structure on the cartridge device.

The method described above, wherein the cartridge device is associated with a user account; and wherein uploading, by the cartridge device, the stored pen input to the accessible network storage device includes uploading by the cartridge device, the stored pen input to a data structure associated with the user account.

One or more computer storage media having computer-executable instructions that, upon execution by a processor, cause the processor to at least:
receive user credentials;
upon verification of the user credentials, link a cartridge device to a user account associated with the user credentials;
collect pen input associated with motion of the cartridge device; and
upon detecting an accessible network storage device over a network connection, upload the collected pen input to the accessible network storage device, wherein the pen input is stored in a data structure associated with the user account.

The one or more computer storage media described above, wherein the user credentials include user biometric data.

The one or more computer storage media described above, wherein the user credentials include handwritten signature input from the cartridge device.

The one or more computer storage media described above, wherein receiving user credentials includes receiving user credentials via a network connection with an electronic device.

The one or more computer storage media described above, wherein uploading the collected pen input to the accessible network storage device includes sharing, by the cartridge device, the user credentials with the accessible network storage device; and upon receiving verification of the user credentials from the accessible network storage device, uploading, by the cartridge device, the collected pen input to the accessible network storage device.

The one or more computer storage media described above, wherein detecting an accessible network storage device over a network connection includes detecting an accessible network storage device over a network connection with a trusted status, wherein a trusted status may be based on at least one of past use of the network connection or definition as a trusted network connection by a user associated with the user credentials.

The one or more computer storage media described above, the computer-executable instructions that, upon execution by a processor, cause the processor to further:
recognize a portion of the collected pen input as handwriting;
convert the recognized portion of the collected pen input into a handwriting data structure;
store the handwriting data structure on the cartridge device; and
wherein uploading the collected pen input to the accessible network storage device includes uploading the stored handwriting data structure to the accessible network storage device.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for capturing pen input by a cartridge device, means for storing the captured pen input, and means for uploading the stored pen input to network data storage associated with a user account. The illustrated one or more processors 619 together with the computer program code stored in memory 622 constitute exemplary processing means for capturing pen input, means for storing pen input, means for verifying user credentials, and means for uploading pen input via network connection.

The term "comprising" is used in this specification to mean including the feature(s) or act(s) followed thereafter, without excluding the presence of one or more additional features or acts.

The invention claimed is:
1. A device comprising:
a cartridge having a cartridge identifier (ID), the cartridge configured to couple to a writing implement, the cartridge capturing content generated by a user with the writing implement, wherein the device is configured to be linked to a user account associated with the user and enable capturing the content after credentials associated with the user are verified, the device being linked to the user account using at least one of an electronic token or other electronic session identifier provided to the device and enabling the cartridge to capture, store and upload content as being associated with the user account; and a memory associated with the user account storing the content generated by the user with the cartridge, the cartridge ID sharable with the memory when the device is linked to the user account, such that the memory records the linking between the user account and the cartridge ID, such that the relationship between the user account and the cartridge ID is accessible to other electronic devices having access to the memory.

2. The device of claim 1, wherein the cartridge includes at least one sensor, wherein capturing content generated by a user with the writing implement includes capturing data generated by the at least one sensor.

3. The device of claim 2, wherein the at least one sensor includes at least one of a motion sensor, an accelerometer, a gyroscope sensor, or a friction based sensor.

4. The device of claim 1, further comprising a network interface transferring the content generated by the user with the cartridge over a network to a portion of the memory communicatively connected to the network, wherein the network interface includes at least one of a wireless network interface or a wired network interface.

5. The device of claim 1, wherein the at least one of the token or other session identifier is at least one of:
temporary, such that the linking between the cartridge and the user account lasts a limited amount of time; or
revocable or rejectable, based on a lack of activity associated with the linking between the cartridge and the user account.

6. The device of claim 4, wherein the memory comprises a cloud server, the content being uploaded to the cloud server; and
wherein the cartridge ID is shared with the cloud server when linking, such that the cloud server records the linking between the user account and the cartridge ID, such that the relationship between the user account and the cartridge ID is accessible to other electronic devices having access to the cloud server.

7. The device of claim 1, further comprising a biometric reader, the biometric reader capturing a fingerprint of a user, wherein the user's identity is verified based on the fingerprint.

8. The device of claim 1, wherein the cartridge is configured to couple to a writing implement by at least one of coupling to a writing tip of the writing implement, coupling to a tip opposite the writing tip of the writing implement, sliding onto a middle portion of the writing implement, or clipping onto a portion of the writing implement.

9. The device of claim 1, wherein the cartridge includes a capture button, wherein the cartridge begins capturing content generated by a user with the writing implement when the capture button is pressed.

10. A computerized method comprising:
receiving user credentials;
upon verification of the user credentials, linking a cartridge device having a cartridge identifier (ID) to a user account associated with the user credentials and enabling capturing content, wherein the linking comprises providing at least one of an electronic token or other electronic session identifier enabling the cartridge to capture, store and upload content as being associated with the user account;
collecting, by the cartridge device, pen input associated with use of the cartridge device;
storing the collected pen input on the cartridge device; and
upon detecting, by the cartridge device, an accessible network storage device associated with the user account over a network connection, uploading, by the cartridge device, the stored pen input to the accessible network storage device, the cartridge ID shareable with the accessible network storage device when the cartridge device is linked to the user account, such that the accessible network storage device records the linking between the user account and the cartridge ID, such that the relationship between the user account and the cartridge ID is accessible to other electronic devices having access to the accessible network storage device.

11. The computerized method of claim 10, wherein collecting pen input associated with use of the cartridge device includes collecting pen input associated with at least one of motion of the cartridge device, angle of the cartridge device, direction of the cartridge device, grip pressure on the cartridge device, or contact with the cartridge device.

12. The computerized method of claim 10, wherein storing the collected pen input on the cartridge device includes recognizing a portion of the collected pen input as handwriting;
converting the recognized portion of the collected pen input into a handwriting data structure; and
storing the handwriting data structure on the cartridge device.

13. The computerized method of claim 10,
wherein uploading, by the cartridge device, the stored pen input to the accessible network storage device includes uploading by the cartridge device, the stored pen input to a data structure associated with the user account.

14. One or more computer storage media having computer-executable instructions that, upon execution by a processor, cause the processor to at least:
receive user credentials;
upon verification of the user credentials, link a cartridge device having a cartridge identifier (ID) to a user account associated with the user credentials and enable capturing content, wherein linking the cartridge device to the user account comprises providing at least one of an electronic token or other electronic session identifier enabling the cartridge to capture, store and upload content as being associated with the user account;
collect pen input associated with motion of the cartridge device; and
upon detecting an accessible network storage device associated with the user account over a network connection, upload the collected pen input to the accessible network storage device, wherein the pen input is stored in a data structure associated with the user account, the cartridge ID shareable with the accessible network storage device when the cartridge device is linked to the user account, such that the accessible network storage device records the linking between the user account and the cartridge ID, such that the relationship between the user account and the cartridge ID is accessible to other electronic devices having access to the accessible network storage device.

15. The one or more computer storage media of claim 14, wherein the user credentials include user biometric data.

16. The one or more computer storage media of claim 14, wherein the user credentials include handwritten signature input from the cartridge device.

17. The one or more computer storage media of claim 14, wherein receiving user credentials includes receiving user credentials via a network connection with an electronic device.

18. The one or more computer storage media of claim 14, wherein uploading the collected pen input to the accessible network storage device includes sharing, by the cartridge device, the user credentials with the accessible network storage device; and upon receiving verification of the user credentials from the accessible network storage device, uploading, by the cartridge device, the collected pen input to the accessible network storage device.

19. The one or more computer storage media of claim 14, wherein detecting an accessible network storage device over a network connection includes detecting an accessible network storage device over a network connection with a trusted status, wherein a trusted status may be based on at least one of past use of the network connection or definition as a trusted network connection by a user associated with the user credentials.

20. The one or more computer storage media of claim 14, the computer-executable instructions that, upon execution by a processor, cause the processor to further:

recognize a portion of the collected pen input as handwriting;

convert the recognized portion of the collected pen input into a handwriting data structure;

store the handwriting data structure on the cartridge device; and wherein uploading the collected pen input to the accessible network storage device includes uploading the stored handwriting data structure to the accessible network storage device.

\* \* \* \* \*